United States Patent [19]

Krysiak

[11] Patent Number: 4,469,475
[45] Date of Patent: Sep. 4, 1984

[54] MACHINERY FOR MAKING ENCRUSTED FOOD PRODUCTS

[76] Inventor: Dobroslaw J. Krysiak, 5058 N. Ridgeway, Chicago, Ill. 60625

[21] Appl. No.: 510,429

[22] Filed: Jul. 1, 1983

[51] Int. Cl.³ .......................... B29D 3/00; B21C 3/04
[52] U.S. Cl. .................................. 425/132; 99/450.6; 425/133.1
[58] Field of Search ............... 99/450.6; 425/133.1, 425/132, 131.1

[56] References Cited

U.S. PATENT DOCUMENTS

| 2,705,463 | 4/1955 | Moore | 425/131.1 |
| 4,015,518 | 4/1977 | Roth et al. | 99/450.6 |
| 4,251,201 | 2/1981 | Krysiak | 425/132 |

FOREIGN PATENT DOCUMENTS 776630 of 0000 United Kingdom ............... 99/450.6

Primary Examiner—Willard E. Hoag
Attorney, Agent, or Firm—Laff, Whitesel, Conte & Saret

[57] ABSTRACT

An extrusion head has at least two preferably co-axial tubes, with an outer tube enclosing at least one inner tube. The end of the inner tube terminates in a flexible sleeve or tube which is supported by a plurality of hinged fingers distributed uniformly around the periphery of the inner tube. Dough is driven under pressure through the outer tube and filling is driven under pressure through the inner tube. When an extrusion valve is closed at the end of the outer tube, the back pressure of the dough closes and folds the flexible sleeve, against the supporting fingers which it surrounds, thereby closing the filling tube and forming a coating of dough for the outer end of the next food product. When the extrusion valve next opens, the coating of dough and the filling are pushed out to extrude and form the outer end of the next encrusted food product. When enough dough and filling have been extruded, the extrusion valve closes to pinch off the extruding flow of dough and filling, in a manner which causes the trailing end of the extruding dough to cover the food product. Various modifications in the extrusion heads enable a great variety of food products to be formed.

30 Claims, 31 Drawing Figures

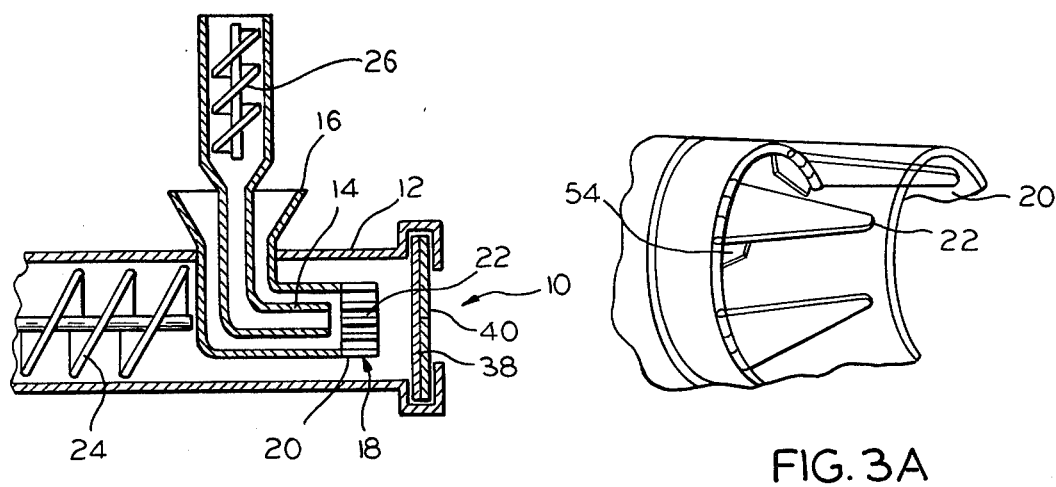
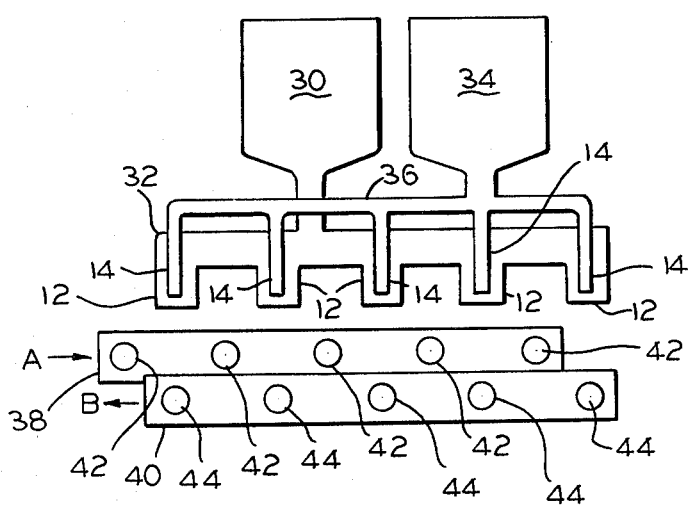
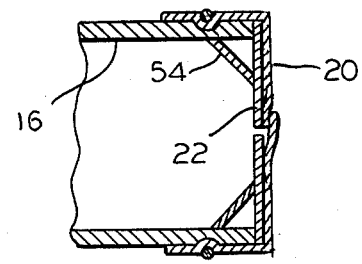
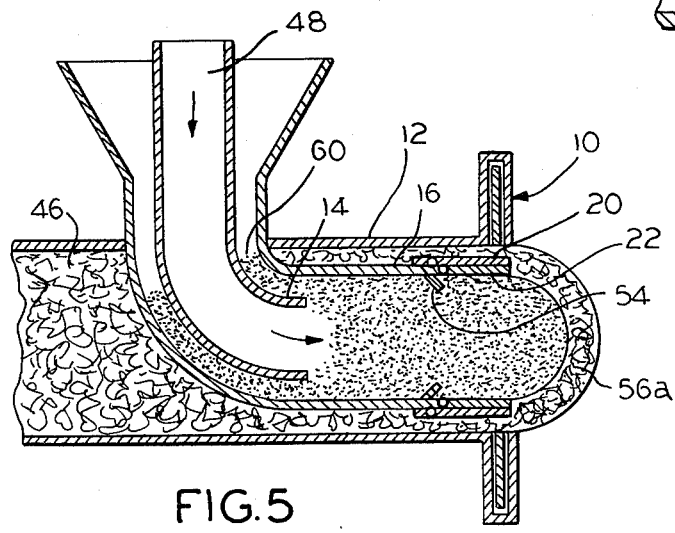
FIG.1
FIG.3A
FIG.2
FIG.3B
FIG.4A
FIG.5
FIG.4B

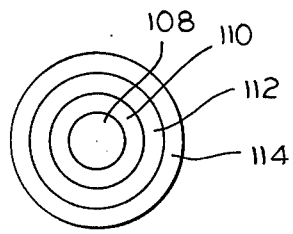
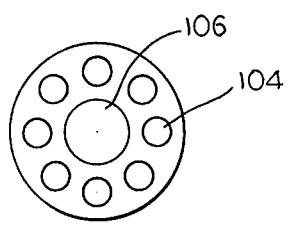
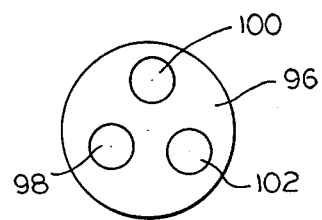
FIG. 17   FIG. 16   FIG. 15
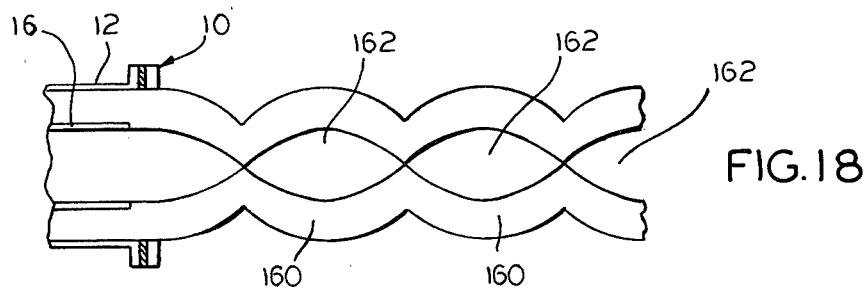
FIG. 18
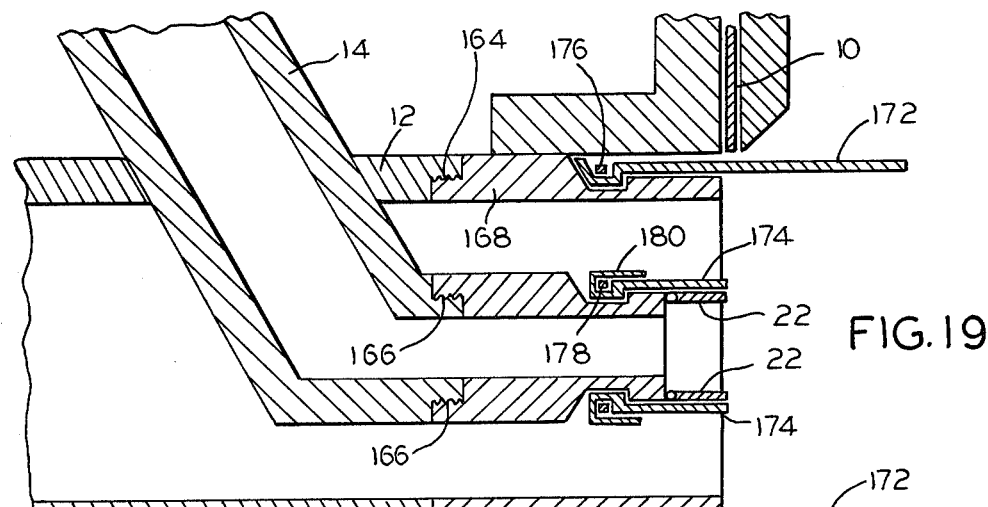
FIG. 19
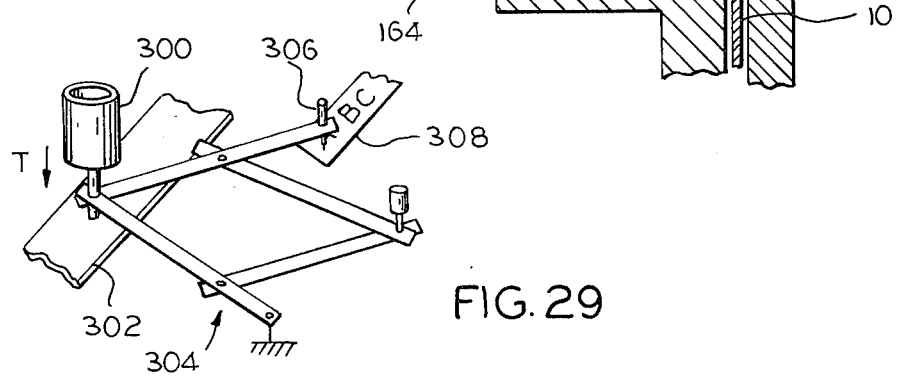
FIG. 29

MACHINERY FOR MAKING ENCRUSTED FOOD PRODUCTS

This invention relates to food machinery and more particularly to machinery for making encrusted food products.

An encrusted food is a product made from a coating shell, hereinafter called "dough" and filled with another product, hereinafter called "filling", for convenience of expression. For example, a hamburger completely enclosed inside a bun is a coating or dough shell filled with meat. Other examples could be a pie filled with fruit, a cookie filled with jelly, a cake filled with marshmallow, a jelly filled doughnut, tamales, ravioli, dumplings, pierogis, and the like. A moments reflection will call to mind many other encrusted food products. Therefore, the terms "dough" and "filling" are not to be viewed as limiting upon the invention. Thus, the invention applies to almost any coating containing a filling.

Sometimes, the filling and the crust or dough are cooked, baked or fried at the same time. In that case, it is desirable for the crust and filling to be put together while in the uncooked state. Other times, the crust may be prepared and cooked in an unfilled manner. Sometimes, people like such an unfilled product, which tends to puff when eaten. Otherwise, the unfilled crust is cut in half and may be filled, with fruit or ice cream, by way of example.

The preparation of encrusted food usually involves a substantial amount of labor since the shaping of the dough and the filling is usually done by hand. An alternative to hand labor normally involves the use of a relatively large machine which has many attachments, each attachment making a different type of encrusted product. Thus, for this prior art machine, there is a need for a large initial capital expenditure, a substantial floor support because the machine is large and heavy, and the inflexibility of having to change attachments everytime that a different kind of product is run through the machine.

In my U.S. Pat. No. 4,251,201, I have disclosed a relatively small machine which makes an encrusted food with a filling. My machine does not require either a massive capital outlay or the housing and physical support required by large food machinery. My earlier patent shows a filling head which is quite successful; however, it required electrical timing controls which made it more complex than it had to be. I have now eliminated the need for such separate controls, by my design of an extrusion head operation. In the specification which follows, it will be convenient to use the term "extrusion valve" and related terms to describe this new operation. As used here, the term "extrusion valve" means a device which gives direction to a flowing stream of dough, by nipping it in toward a central location within the head. As the dough nips in, the flowing stream of dough closes off the stream of filling and builds a back pressure of dough within the head. That back pressure acts as the control over the head operation.

Accordingly, an object of the invention is to provide a new and improved food preparation machine, using the general principles described in my earlier patent while reducing the need for complex controls. Another object is to provide a machine which is suitable for the mass production of many differenty types of encrusted products. Here, an object is to provide food machinery for making most, if not all, of the conventional encrusted food products. In addition, an object is to provide food machinery for creating innovative new products.

Yet another object is to make a general purpose extrusion machine which may serve many needs other than making the food products, per se. In this connection, an object is to provide an extruded tube which may have a number of contiguous layers and which may be pinched off, with an unbroken outer covering, at almost any convenient length.

In keeping with an aspect of the invention, these and other objects are accomplished by providing an extrusion head having at least two tubes, with an outer tube enclosing at least one inner tube. The end of at least the inner tube terminates in a hinged door, or a flexible sleeve or tube which is supported by a plurality of hinged fingers distributed uniformly around the periphery of the inner tube. The dough is driven under pressure through the outer tube and the filling is driven under pressure through the inner tube.

When an extrusion valve is closing at the ends of the tubes, the back pressure of the dough closes and folds the hinged doors or flexible sleeve, against the supporting fingers which it surrounds, thereby closing the filling tube and forming a coating dough for the outer end of the next food product. Also, an outside mechanism may be provided to help open or close the doors or flexible sleeve and its supporting fingers. The filling backs up a back pressure relief tube. Thus, the extrusion valve acts as the control center for the system because the resulting dough movement controls the remaining operations.

When the extrusion valve opens, the coating dough and the filling are pushed out to form the outer end of the encrusted food product. When enough dough and filling have been extruded, the extrusion valve directs the dough inwardly and back pressure builds to act as a control center and pinch off the extruding flow of dough and filling, in a manner which causes the trailing end of the extruding dough to cover the food product with a desired thickness.

For large machines, a plurality of extrusion heads may be used.

A preferred embodiment of the invention may be seen in the attached drawings, wherein:

FIG. 1 schematically shows an inventive machine, in cross section, as including an extrusion head, with the extrusion valve closed;

FIG. 2 schematically shows a large machine (partially in an exploded view) having a plurality of extrusion heads, with a common extrusion valve for ganging and individually controlling each head simultaneously;

FIGS. 3A and 3B are a fragmentary perspective view and a plan view, respectively, of a flexible sleeve, in an open condition, the sleeve being attached to the end of a filling pipe in the extrusion head, as by means of a split C-retaining ring, for example, and supported by a plurality of upstanding fingers;

FIGS. 4A and 4B are a cross sectional and a plan view, respectively, of the end of the sleeve of FIG. 3, in a closed and folded position, and supported by the fingers;

FIG. 5 is a cross sectional view of the extruding head at the start of a food product making cycle;

FIGS. 9-18 show alternative food products which may be made on the machine of FIGS. 1-8;

FIG. 19 is a cross sectional view which shows an alternative embodiment having means for maintaining the cleanliness of the extrusion head;

FIG. 29 shows the head used in connection with a pantagraph, to illustrate an exemplary system use.

Figure 20:
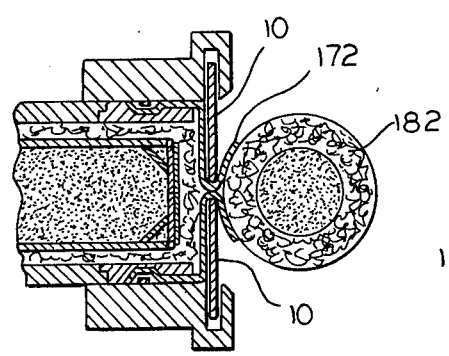
FIG. 20 is a stop motion view which shows the alternative embodiment of FIG. 19 in operation.
Figure 21:
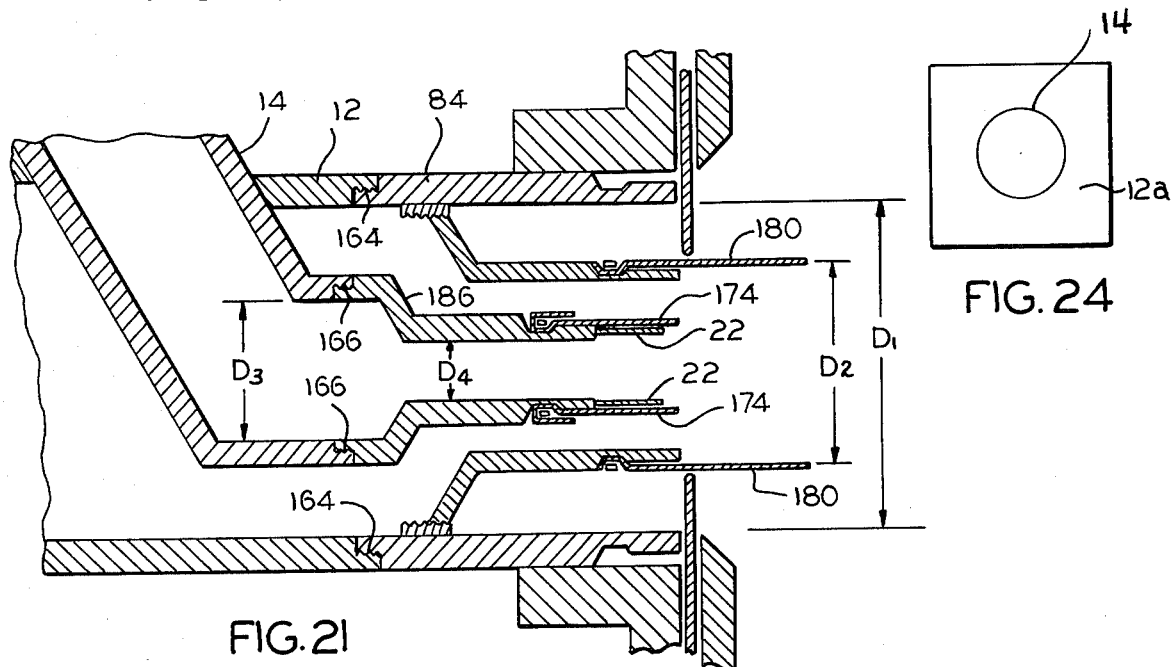
FIG. 21 is similar to FIG. 19 and shows how alternative food products may be made by a use of interchangeable ends on the head.

The principle elements of the inventive extrusion head are seen in FIG. 1 as including an extrusion valve 10, an outer dough delivery tube 12, an inner tube 14 for delivering filling, and a back pressure relief tube 16 surrounding the inner tube 14 to enable the filling to rise and fall responsive to back pressure. In the embodiment of FIGS. 1-8, the relief tube 16 terminates at it tip end 18 in a flexible sleeve 20 supported by a plurality of hinged fingers 22 uniformly distributed around the periphery of the tube 16. In the embodiment of FIGS. 19-21, flexible sleeve tips are also provided around the tip end of the dough tube 12.

While I prefer to use the form of extrusion valve that is shown in my U.S. Pat. No. 4,251,201, I may also use the valves shown hereinafter, in this specification. The principle is that the extrusion valve forces the dough toward the center of the tube, in at least one axis of any suitable cross sectional dimension. The resulting pinching of the dough separates the filling in the successive piece of food product and shapes the outside of the dough.

Any suitable source of pressure is provided for delivering both the dough and the filling to the extrusion valve. For example, FIG. 1 shows an anger 24 for delivering the dough under a source pressure and an anger 26 for delivering the filling under a source pressure. Each of these source pressure devices are designed to build up to and no more than a predetermined pressure, as by the use of a slip clutch which begins to slip when the pressure of the flowing streams of dough or filling reaches a predetermined level, for example. Of course, any other suitable pressure source device may be substituted for the angers, such as pumps, pistons, or the like. Or, a gravity feed may be provided by elevating the levels of dough and filling supply tanks.

FIG. 2 schematically shows how a plurality of the extrusion heads may be ganged together to operate in unison. There is one dough tank 30 feeding five of the dough delivery tubes 12 via a manifold 32. One filling tank 34 delivers the filling through manifold 36 to five of the filling delivery tubes 14. In this case, the source pressure may be provided by either gravity or a pump. The extrusion valve 10 comprises two elongated, flat, preferably metal reciprocally moving plates 38, 40, each having, for example, five openings 42, 44 for selectively opening and closing the extruding outputs of the dough and filling delivery tubes 12, 14, 16. (Plates 38, 40 are in face-to-face contact, as shown in FIG. 1).

Before the extrusion valves operate, there is no opening because holes 42, 44 are not aligned with each other and the plate material between the holes block the passage way. The preferred way to open the five extrusion valves is for the plate 38 to move in direction A and the plate 40 to move in direction B so that holes 42, 44 align before each extrusion head. Obviously, the directions A and B could also be along the vertical or another axis. To close the five valves, the plates are moved back in the opposite directions, to a point where the holes 42, 44 are no longer aligned.

When the holes 42, 44 have different shapes, they may be moved in different directions. For example, a hamburger bun has a cross section which is a long rectangle. Therefore, to make them, each of the delivery tubes 12, 14 would have a corresponding long and rectangular cross section, and the holes 42, 44 become corresponding long rectangles. If the long axis of the rectangle is horizontal, plates 38, 40 should normally move vertically, upwardly and downwardly to open and close the extrusion valves.

In my U.S. Pat. No. 4,251,204, it is necessary to cyclically control and time the operation of the pumping of the coating dough and filling in synchronism with the extrusion valve operation. When the valve is closed, the pumps stop; when it is opened, the pumps start. That timing leads to an expensive control circuit. The present invention eliminates all such control over everything except the extrusion valve 10.

The coating or dough material 46 and filling 48 are continuously pressurized to, but not over, a level which may be overcome by closing valve 10. Conversely stated, valve 10 is strong enough to resist the highest pressure that can build up behind it. The density of the filling 48 may be a liquid, cream, or a solid which does not exceed the density of the coating dough 46. Therefore, mechanically, the dough is strong enough to contain and support the filling regardless of whether valve 10 is opened or closed.

FIG. 3A and 3B show a fragment of the tip end of the filling tube 16 and its sleeve 20 with supporting fingers 22. Distributed around the periphery of this tip end of the tube 16 are a plurality of hinged fingers, one of which is shown at 22, for example. Each finger has a brace (such as 54) associated therewith to hold in a closed position. When the filling is flowing through the tube 14, and the associated overflow tube 14, the fingers 22 are pushed out more or less parallel to the axis of the pipe, by the pressure of the filling. The sleeve 20 also stands out in a cylindrical form (supported by the fingers) because it contains the filling under pressure.

When the extrusion valve 10 closes (FIGS. 4A, 4B), a back pressure of the dough acting upon the sleeve 20 overcomes the pressure of the filling, causes the tube to fold over, collapse, and to seal the end of the tube. When this happens, the fingers 22 are pushed downwardly by the back pressure of the dough pressing upon sleeve 20 until they are stopped by reaching the braces 54, forming a supporting prop against the inner side of the tube 16. At this position, the fingers keep the sleeve 20 from further collapsing and inverting into the tube. Then, the folded sleeve keeps the dough from mixing with the filling.

When valve 10 next opens, both the dough and the filling again move out under pressure to cause the sleeve 20 and fingers 22 once again to extend, as shown in FIGS. 3A and 3B. Thus, the sleeve 20 acts as an automatic, self-operating valve to control the flow of the filling relative to the dough, thereby eliminating the need for separate valves for controlling the flow of dough and filling and a timing circuit for controlling it, as shown in my U.S. Pat. No. 4,251,204.

Figure 6:
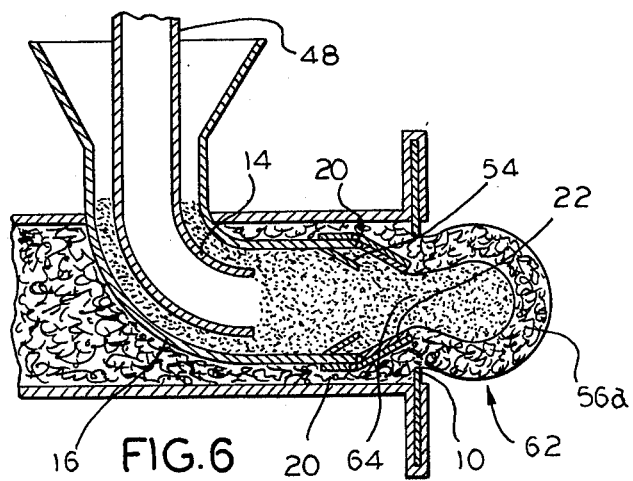
FIG. 6 is a fragmentary part of FIG. 5, at the beginning of the valve closing sequence.
Figure 7:
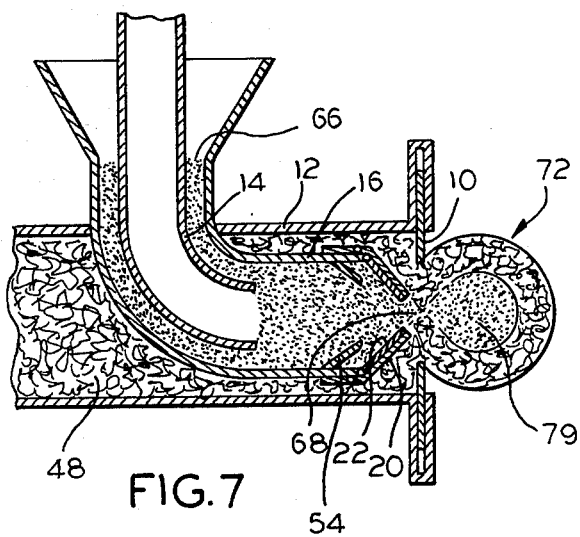
FIG. 7 is a cross sectional view of the extrusion head near the end of the closing cycle.
Figure 8:
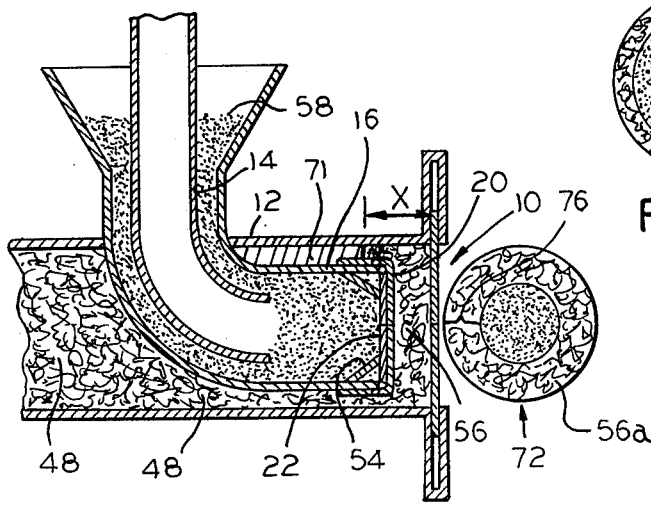
FIG. 8 is a cross sectional view of the closed valve cycle at the end of the food product.

The operating cycle of the extrusion head is shown in FIGS. 5–8. Before the start of a cycle, the extrusion valve 10 is closed (FIG. 8). The dough 48 fills pipe 12, under the source pressure, and flows into the space 56 between the extrusion valve 10 and the closed flexible sleeve 20, supported by fingers 22. Filling 48 fills tube 14, and backs up relief tube 16 as shown at 58, under source pressure, thereby relieving any excessive back pressure of the filling. There are three functions in the general area of the end of tube 16. First, the stream of the filling in tube 14 flows on its way to the food product. Second, a suction builds within the end of the tube 14 owing to the stream of dough flowing around the outside of tube 16 and the inside of tube 12. Third, there is a control over the pressure of the filling.

The extrusion valve 10 opens (FIG. 5) and the source pressure forces the dough in space 56 (FIG. 8) to flow out the valve, as shown at 56a. The filling flows under its source pressure and follows the dough out the open valve 10. The continuous source pressure acts on both dough and filling, and pushes both sleeve 20 and fingers 22 to the open position shown in FIGS. 3A, 3B. As the back pressure on the filling is relieved, the head of the filling within relief tube 16 falls to the level 60 (FIG. 5).

An encrusted product 62 (FIG. 6) begins to form at the outside end of extrusion valve 10. At some point, the valve 10 begins to close (FIG. 6) at a predetermined speed which is related to the physical characteristics of the dough and filling. The speed of the valve closing is in coordination with the rate at which the dough moves under its source pressure. The valve closing is designed to maintain a desired flow rate. The thickness of the dough coating, especially at the back of the food product, is a function of the area between the cross section of the two tubes 12 and 14, and of the distance between the extrusion valve 10 and the end of the inner tube 16.

When the extrusion valve begins to close, both the dough and filling begin to nip in toward the center axis of the tubes, as shown at 64 in FIG. 6. The pressure of the closing valve 10 causes the sleeve 20 and the fingers 22 to begin to close and fold over the end of the tube 16. The head 66 (FIG. 7) of the filling material begins to climb in the pressure relief tube 16 responsive to the back pressure of the filling being closed off by the folding of sleeve 20.

By comparing FIGS. 6, 7, it is seen that the dough in the nip 68 begins to seal itself around the filling 70. The object now is to close the extrusion valve 10 at a speed which enables the formation of the dough at the trailing end of the food product.

Finally, the valve 10 closes (FIG. 8) and the food product is finished. The food product 72 falls away from valve 10 and the cycle repeats.

Various modifications may be made in the food product by changing the nozzle configuration at the output ends of the pipes 12, 16.

Figure 9:
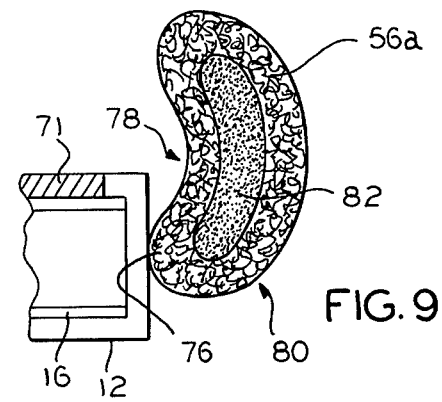

If a divider 71 (FIG. 8) is placed between the two tubes 12 and 14 in the upper area identified by cross hatching in FIG. 8, the dough will form a banana-like shape shown in FIG. 9. In greater detail, if the distance X (FIG. 8) between the extrusion valve 10 and the end of the divider 71 is made short enough, dough cannot flow fast enough within the space remaining above the pipe 16 to keep up with the flow of dough under the pipe 16. This means that the top 78 (FIG. 9) of a food product will be shorter than the bottom 80, thereby causing the dough to form with a curve, which is desired in some forms of foods. If the filling tubes 14, 16 are left empty, the extruding dough will suck air through these tubes and into the center 82, to form a hollow crust. The crust may be left empty to give a puff texture to a person who is eating the product. However, the dough product may also be cut open, and the empty center 82 may be filled with something such as fruit, cream, ice cream, or jelly.

Figure 10:
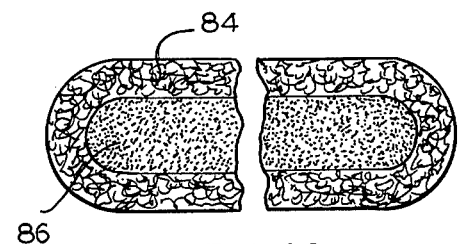

If a generally rectangular crust (FIG. 10) is desired, the tubes 12, 14, 16 may be given a generally rectangular cross section. Then, the crust 84 has a somewhat box like shape (FIG. 10). This configuration is appropriate for, say a hamburger bun, a pie, or the like. In the case of a hamburger, the meat 86 may be extruded as a filling; or, the crust may be cut open and a separately made hamburger may be inserted therein, at a later time.

Figure 11:
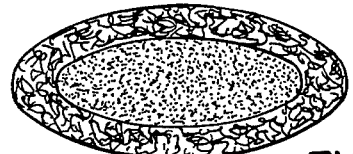

If an oval crust is required (FIG. 11), the tubes 12, 16 are simply given an oval cross section. Perhaps, this configuration is best for a small fruit pie or tart.

Figure 12:
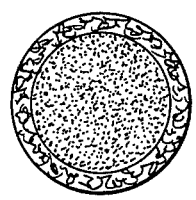
Figure 13:
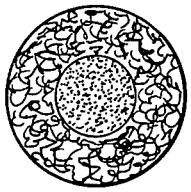

By varying the relative diameters of the tubes 12, 16, the crust may be made thinner (FIG. 12) or thicker 12 (FIG. 13).

Figure 14:
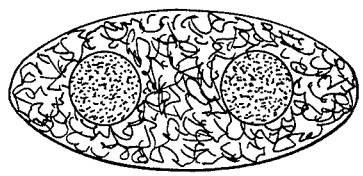

Sometimes, it may be desirable to provide a variety of filling within a single crust. For example, FIG. 14 shows a crust 90 having an oval outer contour caused by an oval cross section pipe 12 and two side-by-side filling pipes 16, which form two cylindrical trails 92, 94 of filling. FIG. 15 shows the same concept used to provide a crust 96 with a circular contour and containing three trails of filling 98, 100, 102, formed by three filling pipes 16. In FIG. 16, a plurality of filling pipes 16 have different diameters to provide eight small cross section trails 104 and one large cross section trail 106, of one or many different kinds of filling.

In FIG. 17, a plurality of the filling tubes 16, of different diameter, are arranged coaxially to give three coaxial filling trails 108, 110, 112 inside of crust 114.

Not shown, a product such as a string of sausages or hot dogs or another previously prepared food product may be fed into pipe 14 (FIGS. 7, 8) and covered with dough.

The extrusion valve 10 may be shaped to give an opening and closure which coordinates with the shape of tube 12. Thus, if tube 12 has an oval or square cross section, the extrusion valve shape may also be oval or square, for example.

FIG. 18 shows a dough product having strings of filled areas. The extrusion valve 10 moves successively between the open position (FIG. 5) and a partially closed position (FIG. 7) and then returns to the open position of FIG. 5, before nipping off the food product. The dough 160 forms a string of separate areas, 162, each of which is filled with any suitable filling material.

FIG. 19 shows an alternative embodiment wherein the tip ends of the various tubes may be interchanged to produce different results. FIG. 19 also illustrates a further refinement wherein a second flexible sleeve is provided for insuring the continued cleanliness of the extrusion valve 10.

In greater detail, each of the tubes 12 and 14 ends in a threaded section, as seen at 164, 166. A separate tip end 168, 170 fits onto the corresponding threaded end section. Each of the tip ends 168, 170 has a flexible sleeve 172, 174 attached thereto by C-ring retainer springs 176, 178, respectively.

The attachment of the inner sleeve 174 is exposed to the dough passing through the tip end 170. Therefore, the end of sleeve 174 is folded back, as a cuff 180, to cover the retainer ring 178 and keep it from accumulating dough or from being dislodged by the flowing dougn. The inner sleeve 174 is supported by the fingers 22 when the valve closes at the end of the tube 14.

The outer sleeve 172 projects through the open extrusion valve 10 far enough to keep it from accumulating food. As shown in FIG. 20, the sleeve 172 fits over and partially wraps the extrusion valve 10 when the valve shuts. Therefore, the food product 182 never comes into contact with the blades of the extrusion valve 10. This feature helps reduce maintenance problems. However, a more important feature is that it meets the standards of some health departments which are charged with inspection of food machinery.

If it is desirable to change the extrusion heads 168, 170 in order to vary the food products, they are unscrewed at threads 164, 166 and replaced by other heads. For example, FIG. 21 shows reducer heads 184, 186 which have replaced heads 168, 170. The diameter at the extrusion ends of tubes 12, 14 have been reduced from D1 to D2 and from D3 to D4. Obviously, the cross sections of the output ends of the tips could also have been changed from circular to oval or square, or the like. The outer sleeve 188 is mounted on the active part (diamter D2) of the tube 12.

The extrusion valve 10 may also be changed to vary the food products. My U.S. Pat. No. 4,251,201 shows an exemplary multi-leaf valve which opens and closes responsive to a rotary action, somewhat as an iris of a camera opens and closes. This configuration is usually preferred; however, it is only one of many forms of valves which may be used, as illustrated in FIGS. 22–28.

Figure 22:
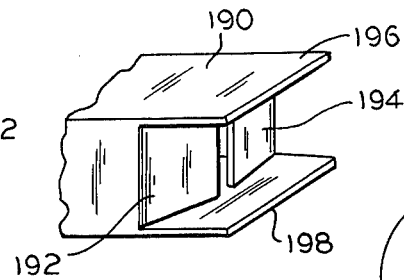
FIGS. 22-28 show alternative extrusion valves which may be used to give certain special effects.

In FIG. 22, the delivery tube 190 has a generally rectangular or square cross section. The extrusion valve is formed by a pair of doors 192, 194 which are hinged on the sides of the tube and which open or close a space between upper and lower guide plates 196, 198.

Figure 23:
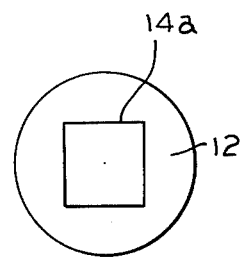
Figure 24:
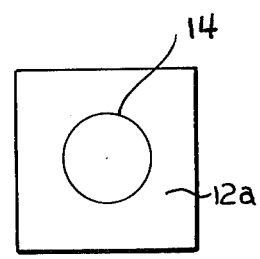

This form of valve (FIG. 22) may be provided on both the ends of inner and outer tubes 14, 12, in which case, both the dough and the filling have a generally rectangular or square cross section. Or, as shown in FIG. 23, the outer tube 12 may have a circular cross section, as described above, and the inner tube 14a may have a rectangular cross section. Or, the valve of FIG. 22 may be formed on the outer tube 12a and the inner tube may retain its circular cross section, as shown in FIG. 24.

Figure 25:
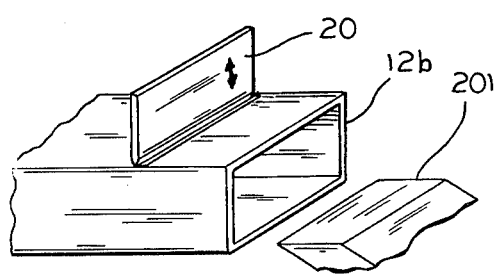

Another form of extrusion valve is shown in FIG. 25, where a guillotine knife blade 200 may move upward or downward to open or close an outer tube 12b. When this form of extrusion blade is used, the food product 201 will tend to have a somewhat trapizodial or truncated pyramidal cross section since the dough flows under the rising edge of blade 200 to give sloping, leading and trailing edges.

Figure 26:
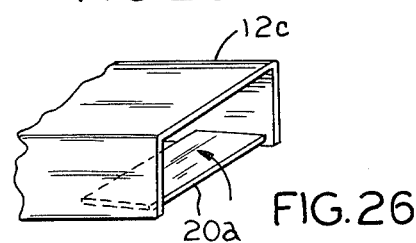
Figure 28:
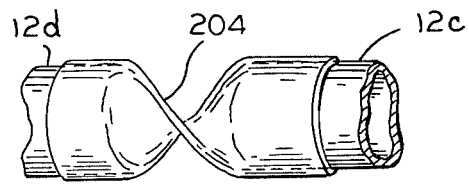

The extrusion valve of FIG. 26 gives a similar effect as a door 202 opens and closes the end of tube 12c.

Figure 27:
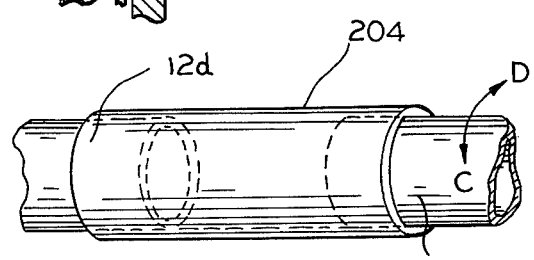

In FIG. 27, there are two axially aligned, spaced apart, relatively hard plastic (such as acrylic) tubes 12d, 12e, with a thin and flexible plastic tube 204 (such as "Mylar" polyester film) stretched out between them. At this time, the dough and filling may be extruded from the tube 12. To close the extrusion valve, the outer tube 12e is rotated in direction C to twist the flexible tube 204 (FIG. 28) to close the extrusion valve. Tube 12e is rotated to an open position in direction D to untwist the tube 204 and return the valve to the condition shown in FIG. 27. This twist valve may be used together with the metal leaves of the extrusion valve, as shown in FIGS. 2 and 5, for example.

The principle of each of these extrusion valves is that it guides the dough in a direction which causes it to (a) nip off the flow of the filling and (b) build up a back pressure which closes the sleeve 20 on the end of the filling tube. This way the dough pressure acts as the control and there is no need for an electrical control over the flow of dough and filling.

It should now be clear that a great variety of different kinds of food products may be made by selecting a proper configuration for the extrusion valve, and the cross sections and the reducers on pipes 12, 16.

There may be many different kinds of systems which may be adapted to use the invention. By way of example, FIG. 29 shows the inventive head 300 directed to discharge the food product downwardly in direction T onto a conveyor belt 302. The head 300 is mounted on a pantagraph 304. Therefore, if a stylus 306 traces a shape on a stencil 308, a food product having the same shape is deposited on a conveyor.

This system may be used to make a conventional product, such as a pretzel. Or, it may be used to make a novelty such as "Happy Birthday" or a persons name.

A moments reflection suggests other systems which may use similar systems.

Those who are skilled in the art will readily perceive how to further modify the invention. Therefore, the appended claims are to be construed to cover all equivalent structures which fall within the true scope and spirit of the invention.

The claimed invention is:

1. An extrusion head for forming a filling within an outer shell, said head comprising at least an outer tube and an inner tube wholly contained within said outer tube, extrusion valve means for controlling the delivery of an extruded product from said outer tube, flexible sleeve means completely surrounding said inner tube for enabling a flow out said inner tube when said extrusion valve means is open and for folding over and closing said inner tube responsive to back pressure in said outer tube when said extrusion valve is closed and finger means hinged to the end of said inner tube for opening and closing with said flexible sleeve and for supporting said sleeve in both said open and closed positions, whereby said flow in said inner tube may be outwardly, but not inwardly.

2. The extrusion head of claim 1 wherein the end of said inner tube is spaced away from the end of said outer tube by a distance which fixed the leading end thickness of material flowing through said outer tube when said extrusion valve means opens.

3. The extrusion head of claim 1 and a flexible sleeve surrounding said outer tube and projecting through said extrusion valve means to cover said extrusion valve and prevent said extruded product from engaging said extrusion valve means in both opened and closed positions.

4. The extrusion head of claim 1 and a flexible sleeve surrounding a tip end of said outer tube and projecting through said extrusion valve means in both opened and closed valve positions.

5. The extrusion head of claim 1 and divider means at one radial position between said tubes for blocking flow of material in said outer tube.

6. The extrusion head of claim 1 and a relief tube extending from said inner tube to a reservoir position whereby material flowing through said inner tube may back up said relief tube responsive to said back pressure.

7. The extrusion head of claim 6 wherein said relief tube is concentric with said inner tube, said flexible sleeve means being attached to an outer tip end of said relief tube.

8. The extrusion head of claim 1 wherein there are a plurality of said heads formed side by side, the extrusion valve means for each of said heads comprising at least one plate having a series of holes formed therein at locations which align with said tubes at an open valve position and which close when said one plate moves to a closed valve position.

9. The extrusion head of claim 8 wherein there are a pair of said plates and each of said pair of plates moves with a reciprocal action to simultaneously open and close said extrusion valve means at each of said heads.

10. The extrusion head of claim 8 and manifold means for delivering extrudable material from a source to at least one of the tubes in each of said plurality of heads.

11. The extrusion head of claim 8 wherein there are two of said manifold means for delivering extrudable material to each of said tubes.

12. An extrusion head for making a food product, said head comprising at least two concentric tubes, a flexible sleeve valve means attached to at least an inner one of said tubes for enabling first material in said inner tube to flow outwardly in only one direction, extrusion valve means for directing a second material in an outer one of said tubes toward a center of said tubes whereby said second material in said outer tube nips in to terminate the flow of said first material and to simultaneously shape the outside contours of said second material.

13. The extrusion head of claim 1 and a second flexible sleeve attached to said outer tube and projecting through said extrusion valve means far enough to prevent an extruded product from engaging said extrusion means.

14. The extrusion head of claim 1 and reducer means associated with tip ends of said tubes for varying the extruding flow of said first and second materials.

15. The extrusion head of claim 1 wherein said extrusion valve means comprises at least one door which swings to open and close at least one of said tubes.

16. The extrusion head of claim 1 wherein said extrusion valve comprises a separate tube which is coaxially aligned with and spaced away from an end of said outer tube, flexible tubular sleeve means interconnecting said separate and outer tubes, and means for rotating said separate tube to twist or untwist said interconnecting flexible tubular sleeve to open and close said extrusion valve.

17. The extrusion head of claim 1 wherein the ends of said tubes are shaped to extrude a uniquely shaped product.

18. The extrusion head of claim 1 and a second flexible sleeve attached to said outer tube and projecting through said extrusion valve means far enough to prevent an extruded product from engaging said extrusion means.

19. The extrusion head of claim 1 wherein the area within said outer tube in the vicinity of the extrusion valve means is shaped to provide the three functions of enabling a flow of said first material, producing a suction acting on said inner tube responsive to the flow of said second material and exerting a pressure upon an extrusion of said first and second material which produces an encrusted food product.

20. The extrusion head of claim 1 wherein the end of said inner tube is spaced away from the end of said outer tube by a distance which fixed the leading end thickness of material flowing through said outer tube when said extrusion valve means opens.

21. The extrusion head of claim 1 and a flexible sleeve surrounding a tip end of said outer tube and projecting through said extrusion valve means in both opened and closed valve positions.

22. The extrusion means of claim 1 and a third tube means associated with said inner tube to relieve back pressure in said first material responsive to a closing of said extrusion valve means.

23. The extrusion head of claim 22 wherein the area within said outer tube in the vicinity of the extrusion valve means is shaped to provide the three functions of enabling a flow of said first material, producing a suction acting on said inner tube responsive to the flow of said second material, and exerting a pressure upon an extrusion of said first and second material which produces an encrusted food product.

24. The extrusion head of claim 1 wherein said extrusion valve means comprises at least one plate means which slides to close the end of said outer tube.

25. The extrusion head of claim 24 wherein at least one of said tubes has a rectangular cross section, a first pair of opposing sides of said rectangular cross sections terminating in upper and lower guide plates, a second pair of opposing sides of said rectangular cross section having a pair of doors hinged thereto.

26. The extrusion head of claim 1 and a system for delivering an elongated food product in a unique shape.

27. The extrusion head of claim 26 wherein said delivery system comprises a conveyor belt and a pantagraph means mounting said extrusion head in a position to deposit said food product on said conveyor belt.

28. The extrusion head of claim 1 and a plurality of said inner tubes being enclosed within said outer tube, means for directing a filling material through each of said inner tubes, and means for directing dough through said outer tube.

29. The extrusion head of claim 28 wherein said plurality of inner tubes are held in a spaced parallel relationship.

30. The extrusion head of claim 28 wherein said plurality of inner tubes are of different diameters and are held in a concentric relationship.

* * * * *